United States Patent
Lu et al.

(10) Patent No.: US 12,486,632 B2
(45) Date of Patent: Dec. 2, 2025

(54) DESERT GREENHOUSE SKELETON SYSTEM AND CONTROL METHOD THEREOF

(71) Applicant: SICHUAN AGRICULTURAL UNIVERSITY, Ya'an (CN)

(72) Inventors: Wei Lu, Ya'an (CN); Yinfu Li, Ya'an (CN); Wenjun Peng, Ya'an (CN); Yangxia Zheng, Ya'an (CN); Sen Wang, Ya'an (CN); Sang Ge, Ya'an (CN); Chengyao Jiang, Ya'an (CN); Mengyao Li, Ya'an (CN); Kexin Guo, Ya'an (CN); Yue Liu, Ya'an (CN); Yifei Su, Ya'an (CN)

(73) Assignee: Sichuan Agricultural University, Ya'an (CN)

( * ) Notice: Subject to any disclaimer, the term of this patent is extended or adjusted under 35 U.S.C. 154(b) by 0 days.

(21) Appl. No.: 19/250,837

(22) Filed: Jun. 26, 2025

(65) Prior Publication Data
US 2025/0320680 A1  Oct. 16, 2025

Related U.S. Application Data

(63) Continuation of application No. PCT/CN2024/106076, filed on Jul. 18, 2024.

(30) Foreign Application Priority Data

Aug. 11, 2023 (CN) .......................... 202311012021.0

(51) Int. Cl.
*E02D 3/115* (2006.01)
*A01G 9/14* (2006.01)
*A01G 9/24* (2006.01)

(52) U.S. Cl.
CPC ................ *E02D 3/115* (2013.01); *A01G 9/14* (2013.01); *A01G 9/24* (2013.01)

(58) Field of Classification Search
CPC .. E02D 3/115; A01G 9/14; A01G 9/24; A01G 9/245; A01G 9/246
See application file for complete search history.

(56) References Cited

U.S. PATENT DOCUMENTS 8,707,617 B2 * 4/2014 Houweling .............. A01G 9/14
                                                                47/17
11,497,177 B2 * 11/2022 Mishra ................... C09K 17/40
(Continued)

FOREIGN PATENT DOCUMENTS

CN      103190269 A     7/2013
CN      205421532 U     8/2016
(Continued)

OTHER PUBLICATIONS

Notice of first Office action dated May 30, 2024 in SIPO application No. CN202311012021.0, 15 pages.
(Continued)

*Primary Examiner* — Frederick L Lagman
(74) *Attorney, Agent, or Firm* — Cooper Legal Group, LLC

(57) ABSTRACT

A desert greenhouse skeleton system and a control method thereof are provided. The desert greenhouse skeleton system includes a greenhouse skeleton including an above-ground skeleton and an underground skeleton detachably combined; freezers operatively attached to the underground skeleton, and the freezers are configured into multiple groups in an annular array manner, and at least partially placed in the sand layer; and a controller communicatively coupled to the freezers and configured to dynamically adjust the freezing parameters of the freezers based on a temperature of the sand layer and/or distribution positions of the freezers, so as to
(Continued)

change the sand layer morphology corresponding to each freezers.

9 Claims, 6 Drawing Sheets

(56) References Cited

U.S. PATENT DOCUMENTS

| | | | |
|---|---|---|---|
| 2015/0223409 A1* | 8/2015 | Abahusayn | A01G 9/14 47/17 |
| 2020/0253138 A1* | 8/2020 | Mishra | C04B 30/00 |

FOREIGN PATENT DOCUMENTS

| | | | | |
|---|---|---|---|---|
| CN | 107736163 | A | | 2/2018 |
| CN | 207427970 | U | | 6/2018 |
| CN | 208446195 | U | | 2/2019 |
| CN | 109618753 | A | | 4/2019 |
| CN | 208754809 | U | * | 4/2019 |
| CN | 211931616 | U | | 11/2020 |
| CN | 212035109 | U | | 12/2020 |
| CN | 212232366 | U | | 12/2020 |
| CN | 112376543 | A | | 2/2021 |
| CN | 113557816 | A | | 10/2021 |
| CN | 215683710 | U | | 2/2022 |
| CN | 115977289 | A | | 4/2023 |
| CN | 219410918 | U | | 7/2023 |
| CN | 117044531 | A | | 11/2023 |
| CN | 118390498 | A * | 7/2024 | ............ E02D 15/00 |
| KR | 20210072611 | A | | 6/2021 |
| RU | 2645035 | C1 * | 2/2018 | ............ E02D 3/115 |

OTHER PUBLICATIONS

Retrieval report-First search dated May 23, 2024 in SIPO application No. CN202311012021.0, 7 pages.
Notification to Grant Patent Right for Invention dated Aug. 14, 2024 in SIPO application No. CN202311012021.0, 3 pages.
International Search Report issued in corresponding PCT Application No. PCT/CN2024/106076 dated Oct. 18, 2024, 7 pages.
Yue Fengtian, "Key Technologies for Artificial Ground Freezing Construction of Subsea Cross Passages", Dec. 31, 2020, p. 3, Edition 1, China University of Geosciences Press, 5 pages.

* cited by examiner

DESERT GREENHOUSE SKELETON SYSTEM AND CONTROL METHOD THEREOF

CROSS-REFERENCE TO RELATED APPLICATIONS

This application is a continuation of International Patent Application No. PCT/CN2024/106076, filed on Jul. 18, 2024, and claims priority of Chinese Patent Application No. 202311012021.0, filed on Aug. 11, 2023. The contents of International Patent Application No. PCT/CN2024/106076 and Chinese Patent Application No. 202311012021.0 are hereby incorporated by reference.

TECHNICAL FIELD

The disclosure relates to the technical field of greenhouses, in particular to a desert greenhouse skeleton system and a control method thereof.

BACKGROUND

Desert areas refer to those areas with extremely low precipitation, great evaporation, low soil water content and low vegetation coverage. At present, desert geographical features account for about 20% of the global land area. However, due to a rapid evaporation of water in the desert, large temperature difference between day and night, strong wind erosion and other reasons, the desert is not a livable area for human beings, nor is it suitable for planting crops and keeping animals in captivity. As a result, about one-fifth of the world's land area is idle. In view of this phenomenon, technicians in this field put forward a technical scheme of building greenhouses in the desert.

Chinese Patent No. 215683710U discloses an ecological greenhouse for desert planting, including a windward wall, a guiding sand plate, a keel and a front wall. A front side of a top end of the windward wall is fixed with the guiding sand board by screws; a top of a front end of the windward wall is inlaid and connected with a back end of the keel, and the top of the front end of the windward wall is connected with the back end of the keel through a bolt fixing mode; a bottom of the front end of the windward wall is embedded on a top end of the front wall, and the bottom of the front end of the windward wall is connected with the top end of the front wall through bolt fixing. The keel includes longitudinal bone and transverse bone, multiple longitudinal bones and transverse bones are provided, and the multiple longitudinal bones and transverse bones are arranged in a grid.

Because an adhesion between sand in the desert is not strong, problems of foundation settlement and foundation inclination often occur in greenhouses built on the desert. Therefore, those skilled in the art propose a desert temperature greenhouse that may prevent subsidence. For example, Chinese Patent No. 212035109U discloses an anti-subsidence desert planting greenhouse, including multiple fixing frames. The multiple fixing frames are fixedly connected through pins, and a supporting base is fixed inside the fixing frames, a top of the supporting substrate is fixed with a planting frame and a fixing seat A lifting rod is fixed on the fixing seat, and a supporting beam is fixed at a top end of the lifting rod; a top end face of the planting frame is clamped with a permeable planting groove; the supporting base includes a bottom plate matched with the fixing frame, and a supporting plate is fixed on a top end face of the bottom plate through the fixing plate; a bottom of an inner wall of the fixing frame is provided with a connecting hole, and a peripheral side of the fixing frame is provided with a pin hole.

However, even if an existing way of increasing a contact area between a foundation and a desert surface is adopted for greenhouse construction, due to a windy and strong wind environment in the desert area and the difference in a stability of sand layers in different sand areas, some sand contacting the foundation surface will still be displaced under a long-term wind force. In addition, the temperature in desert area is extremely high day and night, and a huge difference of moisture in sand area in the morning and evening leads to an instability and collapse of greenhouse structure. Especially during the daytime, the temperature rises, and the water evaporates continuously, causing the low water content parts in contact with the ground surface of the greenhouse soft and easy to loosen, so the low water content part moves from under the ground to other positions under an action of wind, which destroys the structure stability of the foundation of the greenhouse and the surrounding environment, leading to problems such as foundation settlement and structural inclination in the greenhouse, and finally affecting crop growth.

In addition, on the one hand, there are differences in understanding of the technicians in this field; on the other hand, because the applicant studied a large number of documents and patents when making this disclosure, but not all the details and contents are listed in detail due to a limitation of space. However, this is by no means that the present disclosure does not have the features of the prior art. On the contrary, the present disclosure already has all the features of the prior art, and the applicant reserves the right to add relevant prior art to the background.

SUMMARY

Aiming at shortcomings of the prior art, the disclosure provides a desert greenhouse skeleton system and a control method thereof, aiming at solving at least one or more technical problems existing in the prior art.

In order to achieve the above object, the present disclosure provides a desert greenhouse skeleton system, including:
  a greenhouse skeleton, including an above-ground skeleton and an underground skeleton detachably combined;
  multiple freezers operatively attached to the underground skeleton and at least partially placed in a sand layer, where the multiple freezers are configured into multiple groups in an annular array manner;
  a controller communicatively coupled to the freezers and configured to dynamically adjust freezing parameters of the freezers based on a temperature of the sand layer and/or the distribution positions of the freezers in the annular array.

In this disclosure, the freezer is in a form of freezing column, and multiple freezing columns are divided into multiple groups in a circular array manner, which means connecting lines of the multiple freezing columns in each group form a circular structure, and the multiple groups of freezing columns are arranged in circles concentrically within a plane. When the freezing column is attached to the underground skeleton and inserted into the sand layer, the freezing column may be used as a foundation supporting structure to reinforce the greenhouse skeleton together with a spiral column. In addition, based on a temperature difference between inside and outside the greenhouse, a corresponding sand layer is frozen by using the sand layer and an additional water source through the freezing column, so the sand layer as the foundation may be condensed into a solid structure in the desert area with large temperature difference between day and night, thus the sand layer as the foundation may be reinforced again to prevent the collapse of the greenhouse skeleton structure. Besides, a semiconductor freezer of the disclosure may utilize natural water circulation to dissipate heat, and the semiconductor freezer may refrigerate immediately after being electrified, making the sand layer directly and rapidly frozen, and a consumption of water resources in the desert environment is reduced, and there is no risk that salt water leaks to pollute the sand layer environment.

In some embodiments, the controller is configured to dynamically adjust the freezing parameters of one or more freezers in each group of the annular array over time based on a temperature change of the sand layer caused by a change of a sunlight trajectory.

In some embodiments, a cooling power of a part of the freezers corresponding to a sunny side of the greenhouse skeleton related to the sunlight trajectory over time is greater than a cooling power of a part of the freezers corresponding to a shady side. In desert areas, because the temperature difference between day and night changes greatly, the disclosure dynamically adjusts the cooling power of the freezing column according to the temperature change of the sand layer, improves an overall cooling power during high temperature sunshine, and reduces the overall power during night or low temperature. In the disclosure, a refrigeration intensity of the freezing columns on the sunny side and the shady side of the greenhouse is dynamically adjusted in a manner related to a changing sunlight trajectory, so an overall structure strength of the sand layer as a foundation part is ensured, and at the same time, the desert hydropower resources are saved. In addition, due to a higher cooling power and lower temperature of the corresponding sand layer on the sunny side of the greenhouse skeleton, more hot air will gather and condense here compared with the shady side of the greenhouse skeleton based on a promotion of heat transfer temperature difference, thereby the freezing column may use the condensed water to reinforce the corresponding sand layer results. Further, a continuous frozen body formed by strengthening the greenhouse may be used as water for crop cultivation in the greenhouse.

In some embodiments, the freezing parameters of the freezers dynamically adjusted by the controller based on distribution positions of the freezers in the annular array include cooling powers of the multiple freezers controlled to vary along an arrangement direction of the annular array. Due to the different temperatures inside and outside the desert greenhouse, different sand layers have different degrees of temperature fluctuation and water loss patterns. Therefore, according to the corresponding temperature change state of different sand areas, different refrigeration intensities are provided in different annular arrays to ensure a condensation form of sand areas with strong temperature fluctuation and water loss may be maintained and reduce power consumption.

In some embodiments, the cooling power of one or more freezers in the outer annular array is less than the cooling power of one or more freezers in the inner annular array. Because the temperature fluctuation difference between day and night in the sand layer inside the greenhouse is small, and the inner sand layer has a relatively high humidity relative to the outer sand layer, it is beneficial to improve and maintain the stability of the whole greenhouse skeleton foundation structure compared with improving the cooling power of the freezing column inside the greenhouse, and may reduce an overall consumption of hydropower energy in desert situations, especially an energy consumption caused by an obvious improvement of the cooling power of the freezing column due to a continuous fluctuating temperature change of the outer sand layer.

In some embodiments, the desert greenhouse skeleton system provided by the disclosure further includes multiple operable humidifying pipelines, and the multiple humidifying pipelines are mutually staggered and connected to the underground skeleton. Water is injected into the sand layer at a joint of the foundation through the humidifying pipeline, so the freezing column cools and condenses the corresponding sand layer by using the water of the sand layer, thereby condensing the sand layer as a part of the foundation into a solid structure and strengthening the structure stability of the sand layer foundation.

In some embodiments, the freezer provided by the disclosure may include a hot end protective sleeve; a cold end protective sleeve arranged radially outside the hot end protective sleeve; and multiple semiconductor chilling plates axially and circumferentially arranged between the hot end protective sleeve and the cold end protective sleeve.

In some embodiments, the multiple semiconductor chilling plates may be connected to each other through a flexible circuit to form multiple annular arrays along the axial direction of the hot end protective sleeve and/or the cold end protective sleeve.

The disclosure further provides a method for controlling the desert greenhouse skeleton, including:
arranging multiple freezers into multiple groups in a manner of a ring array, distribution positions of the freezers in the annular array including an outer annular array and an inner annular array; and attaching the freezers of each group to an underground skeleton of the greenhouse skeleton;
acquiring temperature data of a sand layer related to the greenhouse skeleton in a manner associated with the distribution positions of the freezers; and
dynamically adjusting freezing parameters of the freezers based on the temperature data of the sand layer and/or the distribution positions of the freezers in the annular array.

In some embodiments, steps of dynamically adjusting the freezing parameters of the freezer based on the temperature data of the sand layer and/or the distribution positions of the freezers in the annular array may include:
dynamically adjusting freezing parameters of one or more freezers in each group of the annular array over time based on a temperature change of the sand layer caused by a change of the sunlight trajectory; and/or
enabling the multiple freezers to have varying cooling powers along an arrangement direction of the annular array.

DETAILED DESCRIPTION OF THE EMBODIMENTS

In the following, optional embodiments of the present disclosure will be described in detail with reference to the attached drawings, so advantages and features of the present disclosure may be more easily understood by those skilled in the art, and a protection scope of the present disclosure may be more clearly defined.

Embodiment 1

The disclosure provides a desert greenhouse skeleton system, the system may include a greenhouse skeleton, freezing devices operatively mechanically coupled/attached to the greenhouse skeleton, and an industrial controller as a control core of the greenhouse skeleton system.

Specifically, the desert greenhouse skeleton system provided by the disclosure may include: the greenhouse skeleton, multiple freezers 230 and a controller 270.

The greenhouse skeleton includes an above-ground skeleton 100 and an underground skeleton 200, the above-ground skeleton 100 and the underground skeleton 200 are detachably combined.

The multiple freezers 230 operatively attached to the underground skeleton 200 and at least partially placed in the sand layer. The multiple freezers 230 are divided into multiple groups in an annular array manner.

The controller 270 communicatively coupled to the freezers 230 and configured to dynamically adjust the freezing parameters of the freezers 230 based on the sand layer temperature and/or the distribution positions of the freezers 230.

Figure 1:
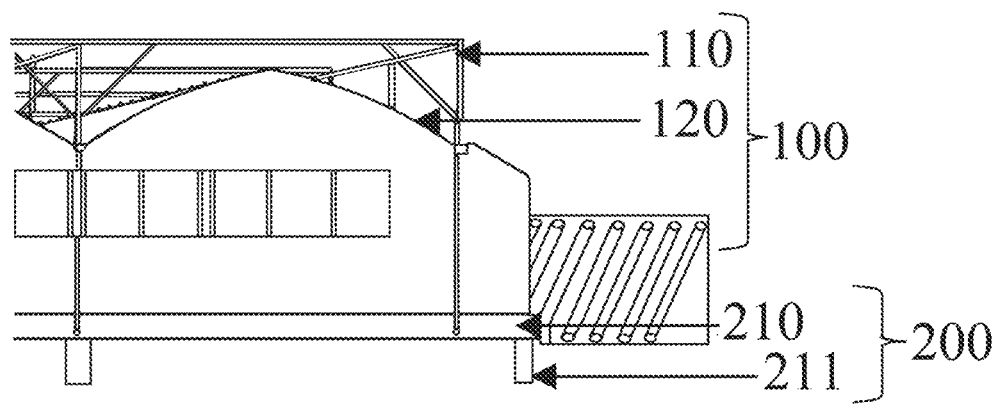
FIG. 1 is a partial structural schematic diagram of a greenhouse according to an embodiment provided by the present disclosure.

In particular, FIGS. 1 to 4 show the structural schematic diagram of the greenhouse skeleton under an optional embodiment. Specifically, as shown in FIG. 1, a greenhouse skeleton or greenhouse is built by a pipe rack mechanism, the pipe rack mechanism consists of the underground skeleton 200 and the above-ground skeleton 100 arranged above the underground skeleton 200 for building a facade and a top surface of the greenhouse. The underground skeleton 200 is laid on a sand layer surface or the sand layer as the skeleton foundation. Further, a thermal insulation layer may be laid between the above-ground skeleton 100 and the underground skeleton 200, and a surface of the thermal insulation layer may be used for burying planting soil.

Figure 2:
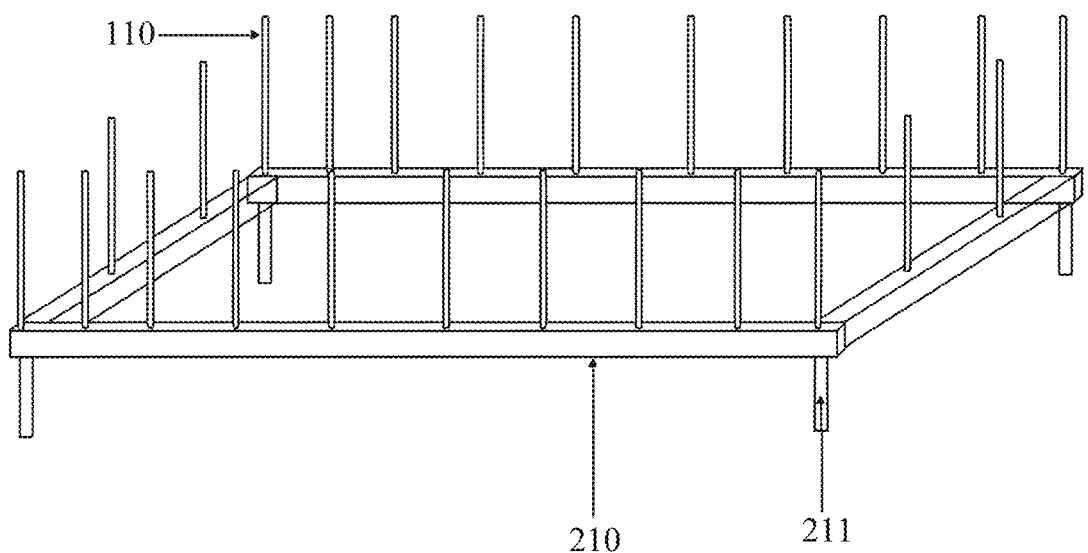
FIG. 2 is a simplified structural diagram of a desert greenhouse skeleton according to the embodiment provided by the present disclosure.
Figure 3:
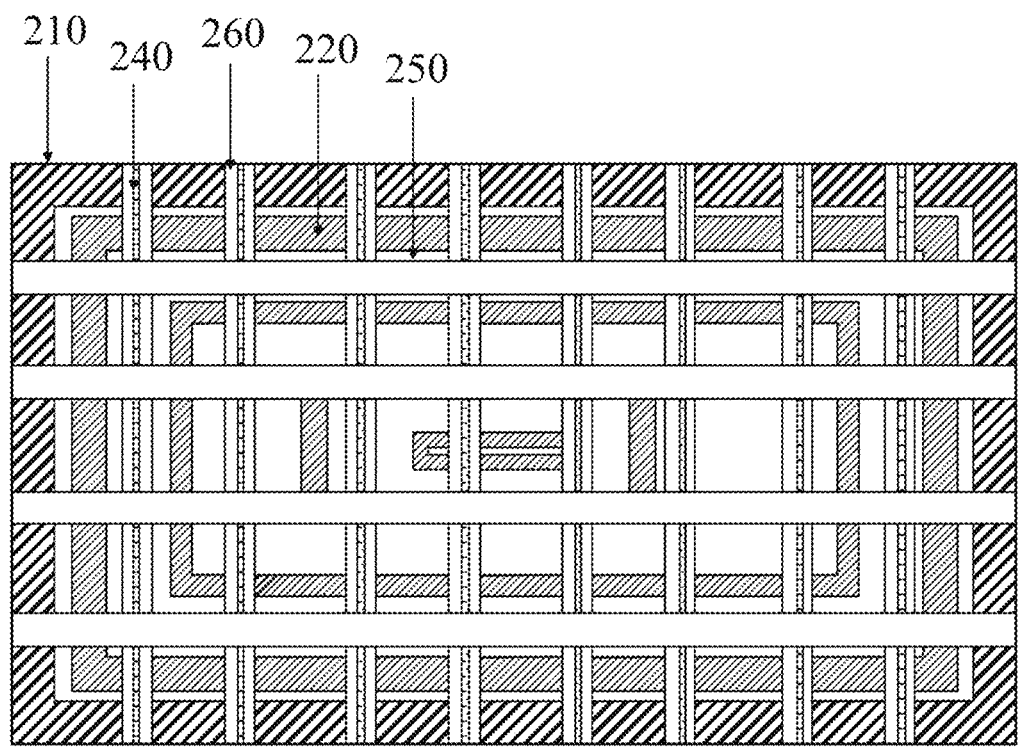
FIG. 3 is a schematic top view of the greenhouse skeleton according to the embodiment provided by the present disclosure.
Figure 4:
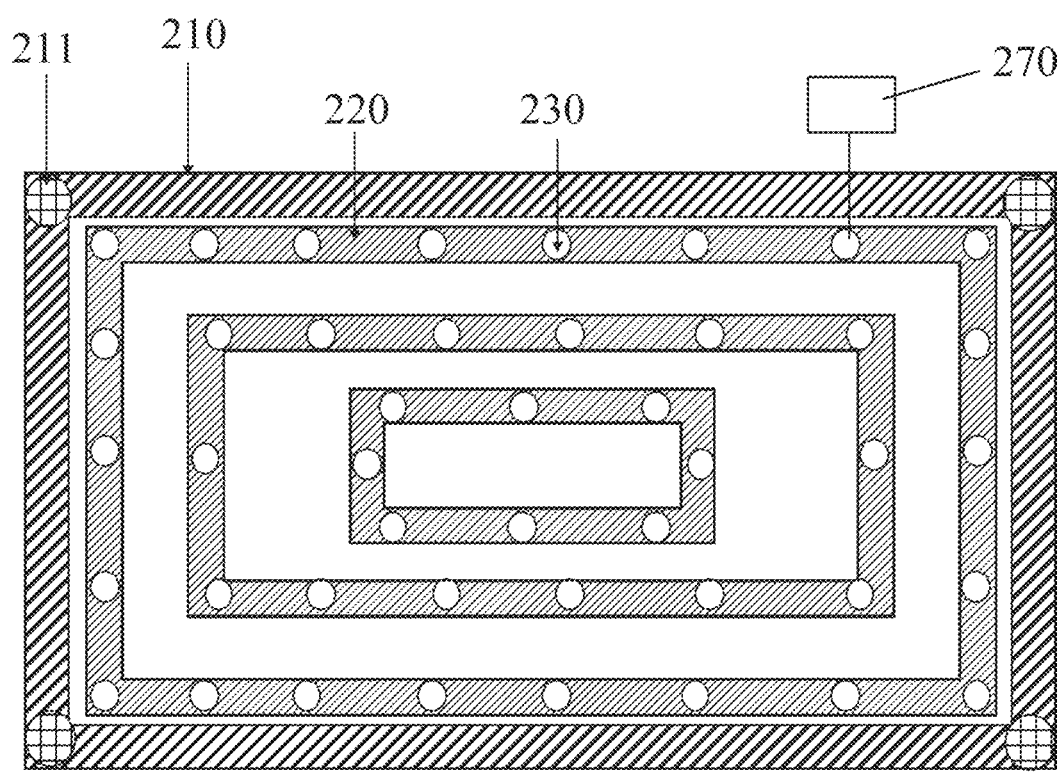
FIG. 4 is a schematic bottom view of an underground skeleton according to the embodiment of the present disclosure.

According to an optional embodiment, referring to FIG. 1 and FIG. 2, the underground skeleton 200 may include a skeleton outer base 210 and multiple skeleton inner bases 220. Specifically, as shown in FIG. 2, FIG. 3, and FIG. 4, the skeleton outer base 210 is basically a frame-like enclosing structure, the structure is formed by connecting and enclosing multiple strip columns. Further, as shown in FIG. 1 and FIG. 2, multiple base columns 211 are arranged at intervals on one side of the skeleton outer base 210 facing or contacting the sand. Each base column 211 is inserted into the sand layer substantially vertically, thereby stabilizing the skeleton outer base 210 as a basic frame. In particular, the base column 211 optionally adopts a spiral pile structure, namely a continuous thread structure may be formed on an outer peripheral surface of the column. An advantage of spiral pile column is that the spiral pile column may be quickly arranged on soft soil, and the spiral pile column may improve a settlement of buildings on soft soil, so the spiral pile column has good applicability to desert areas.

According to an optional embodiment, in the present disclosure, part or all of the spiral pile-type base columns 211 may be connected together by connecting wires, that is, adjacent base columns 211 are connected by connecting rods or connecting ropes to strengthen the stability of the base columns 211 to the skeleton outer base 210 outside the skeleton, thereby reducing a possibility of large settlement of the skeleton structure in the desert.

According to an optional embodiment, referring to FIG. 3 and FIG. 4, multiple skeletal inner bases 220 are arranged on a closed inner side of the skeletal outer bases 210. Specifically, the same as or similar to the skeleton outer base 210, the skeleton inner base 220 is basically a frame-like enclosing structure, the structure is formed by connecting and enclosing the strip columns. Further, for example, when viewed from a bottom view as shown in FIG. 4, the multiple skeleton inner bases 220 are arranged at intervals on a radial side of each other, thereby forming a skeleton structure with a substantially rectangular-ambulatory-plane shape on an inner side of the skeleton outer bases 210, i.e., the multiple skeleton inner bases form the concentric rectangles. In particular, multiple skeleton inner bases 220 may be arranged around each other at linearly or nonlinearly varying intervals.

As an illustration of a non-limiting example, in the present disclosure, the freezing device or freezer 230 attached to the underground skeleton 200 may adopt a freezing column based on semiconductor refrigeration technology, that is, a thermoelectric effect of semiconductor materials is used for refrigeration. Specifically, a direct current passes through a couple formed by two semiconductor materials in series, so two ends of the couple absorb heat and release heat respectively, thus realizing a refrigeration effect.

According to an optional embodiment, the multiple freezers 230 (i.e. freezing column) are attached to the skeleton inner base 220 in each skeleton according to a preset arrangement rule, and are at least partially vertically placed in the sand layer. Specifically, referring to FIG. 4, multiple freezing columns are respectively connected to a corresponding skeleton inner base 220 along a gap of the circular structure of each skeleton inner base 220, and are inserted into the sand layer substantially vertically. In particular, the freezing column is controlled to reduce the temperature of the sand layer around the freezing column and condense moisture in the sand, so the sand layer as the foundation part is changed from a sparse and scattered soft state to a more compact and reinforce state. Even if the sand around the sand layer with a solid structure is blown to other places by the wind, a solid sand layer as the foundation structure will not appear a situation of foundation settlement and inclination like ordinary sand layers after structural reinforcement, thereby improving the stability of the desert greenhouse and ensuring a service life of the desert greenhouse.

Figure 5:
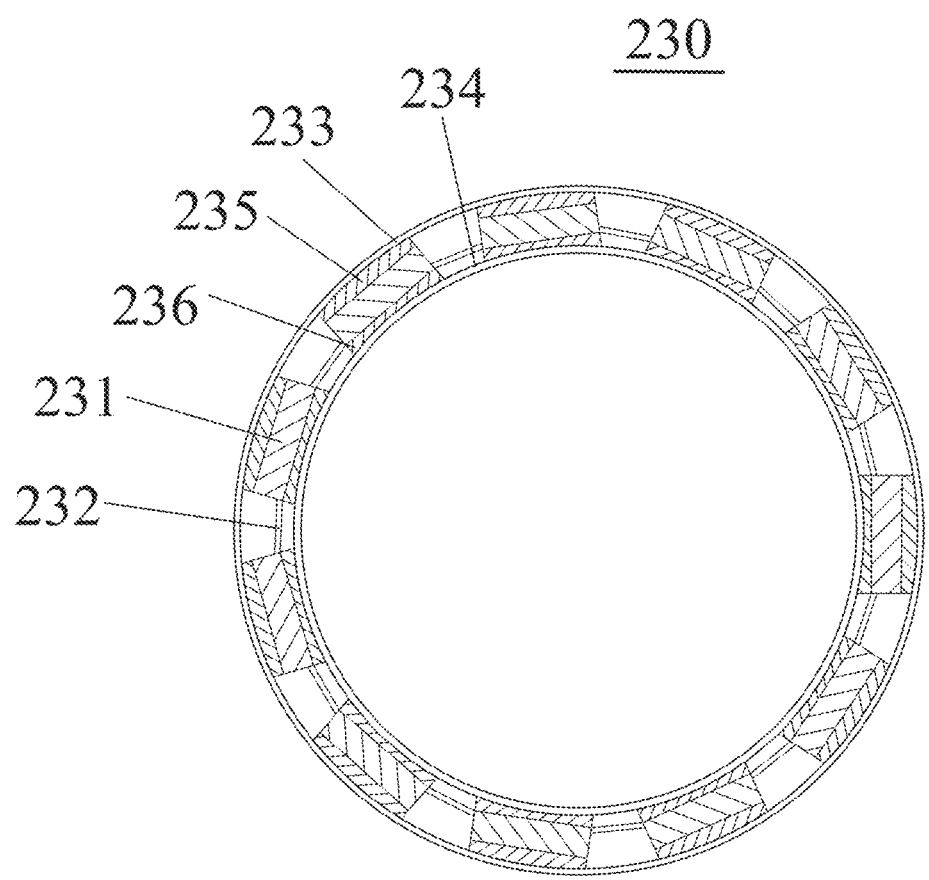
FIG. 5 is a schematic top view of the freezer according to the embodiment provided by the present disclosure.

As an illustration of a non-limiting example, FIG. 5 shows a special case of the freezer 230 based on semiconductor refrigeration technology according to the present disclosure. Referring to FIG. 5, the freezer 230 (or freezing column) is constructed in a cylindrical structure. The freezer 230 may include an inner shell and an outer shell, the outer shell is designed as a cold end protective sleeve 233 and the inner shell is designed as a hot end protective sleeve 234. Further, multiple semiconductor chilling plates 231 are arranged between the cold end protective sleeve 233 and the hot end protective sleeve 234 at intervals along an axial direction and a circumferential direction of the freezer 230. A side of the semiconductor chilling plate 231 facing the cold end protective sleeve 233 is a cold end. The side of the semiconductor chilling plate 231 facing the hot end protective sleeve 234 is a hot end. In particular, the semiconductor chilling plate 231 may be a P-N (Positive-Negative) semiconductor heterojunction composed of a P-type semiconductor and an N-type semiconductor.

According to an optional embodiment, the cold end of the semiconductor chilling plate 231 is close to the cold end protective sleeve 233. The hot end of the semiconductor chilling plate 231 is close to the hot end protective sleeve 234. Further, a cold end heat conduction layer 235 is arranged between the cold end of the semiconductor chilling plate 231 and the cold end protective sleeve 233. The cold end heat conduction layer 235 enables the heat outside the freezer 230 to be transferred from the cold end protective sleeve 233 to the cold end of the semiconductor chilling plate 231. The cold end heat conduction layer 235 may fill the gap between the semiconductor chilling plate 231 and the cold end protective sleeve 233, so the efficiency of heat transfer is improved.

According to an optional embodiment, a hot end heat conduction layer 236 is arranged between the hot end of the semiconductor chilling plate 231 and the hot end protective sleeve 234. The hot end heat conduction layer 236 enables the heat generated at the hot end of the semiconductor chilling plate 231 to be quickly transferred to the hot end protective sleeve 234, and then the heat in the hot end protective sleeve 234 is taken away by a cooling medium (i.e. water) introduced into the hot end protective sleeve 234 to complete heat dissipation. Specifically, a pipeline for conveying the cooling medium may include an inner pipe and an outer pipe formed by the hot end protective sleeve 234, and the cooling medium may be fed from the inner pipe and discharged from the annular gap between the inner pipe and the outer pipe after reaching the other end. The hot end heat conduction layer 236 may fill the gap between the semiconductor chilling plate 231 and the hot end protective sleeve 234, so an efficiency of heat transferring is improved.

According to an optional embodiment, the multiple semiconductor chilling plates 231 arranged along the circumferential direction and the axial direction of the freezer 230 may be connected in series through a flexible circuit 232 to form an annular structure with a substantially ring shape. In particular, each freezer 230 may be sequentially arranged with multiple annular structures surrounded by semiconductor chilling plates 231 along the axis direction of the freezer 230 to ensure an entire outer surface of the freezer 230 may freeze the sand layer.

Optionally, the flexible circuit 232 may adopt a high thermal conductivity metal-based copper clad laminate. Specifically, the high thermal conductivity metal-based copper clad laminate of the flexible circuit 232 may be formed by hot pressing the soft copper, the flexible high thermal conductivity adhesive film and the rolled copper foil. In this way, the high thermal conductivity metal-based copper clad laminate has good flexibility and is easy to be curled.

In particular, an arrangement position and number of semiconductor chilling plates may be changed as required. Alternatively, the semiconductor chilling plate may adopt one or more of single-stage refrigeration, secondary refrigeration and multi-stage refrigeration.

It may be understood that a use of the freezer 230 based on the semiconductor refrigeration principle is an illustration as a non-limiting optional example and should not be regarded as a specific limitation of the present disclosure. Alternatively, the freezer 230 may also adopt a traditional freezer based on negative temperature refrigerant medium refrigeration, that is, the negative temperature brine circulating in the freezer absorbs the heat of the sand layer to condense a water-containing sand layer around the freezer 230 from the near to the distant, so the sand layer forms a continuous frozen body.

According to an optional embodiment, the power of the freezer 230 may come from a solar power station, a wind power station and/or a generator device. Especially, for desert areas far away from urban areas or oases, a problem of electricity consumption in desert greenhouses is very difficult. Power supply to desert areas involves long-distance line laying, and extreme weather such as strong wind and dust in desert areas brings great challenges to the long-distance laying, operation and maintenance of desert power grid, especially the wind erosion and quicksand accumulation have a significant impact on the stability of tower foundation columns and an insulation performance of transmission lines, thus threatening the stability and safety of power transmission. Moreover, because of a particularity of desert climate, a loss of long-distance power transmission increases significantly, so it is not easy to maintain stable power supply for desert greenhouse by relying on long-distance power transmission.

On the contrary, the electricity generated by photovoltaic power plants built in the desert is the best choice for desert greenhouses, because: there are still many typical defects in the long-distance transmission of electric energy generated by photovoltaic power plants, that is, photovoltaic power plants are mostly built in remote desert areas far away from urban areas or oases, and the problems of stable electric energy transmission and waste still exist when the electric energy generated by photovoltaic power plants is transported to power-consuming areas for residential electricity consumption, especially in winter, some areas rely on coal-fired electricity to make the electric energy generated by photovoltaic power not be effectively utilized. Therefore, photovoltaic power is optionally taken locally, that is, photovoltaic power generation and greenhouse cultivation combined mode. Photovoltaic power station not only improves a utilization rate of renewable energy in desert areas, but also helps to control sand to improve desert ecology, and at the same time has an auxiliary function of sand fixation to maintain a structure stability of desert greenhouse skeleton.

In the disclosure, in order to maintain the structure stability of the greenhouse skeleton in the sand area, especially in a quicksand area or the water-containing sand layer, the freezer 230 is adopted to strengthen the strength of the sand layer foundation. However, the use of the freezer 230 involves more energy consumption than a daily electricity consumption of the greenhouse, so it is more economical and environmentally friendly to use the electricity generated by a desert photovoltaic power station to maintain an intermittent or continuous high output of the freezer 230. Because one of the most abundant renewable energy sources in the desert is solar energy, using photovoltaic energy to maintain the output of the freezer 230 to stabilize the desert greenhouse solves a limitation of long-distance power supply for the desert greenhouse. Moreover, a utilization of photovoltaic power not only improves the recycling rate of natural resources, but also provides a stable power source for the continuous refrigeration of the freezer 230, and at the same time, the utilization of photovoltaic power also prevents the power generated by photovoltaic power plants from being efficiently utilized. In addition, the electric energy generated by the photovoltaic power station itself may also be used as a power source of the equipment/devices related to crop cultivation in the desert greenhouse, such as lighting, spray irrigation and/or temperature adjustment, so as to meet the environment required for a growth and survival of crops in the desert environment.

According to an optional embodiment, the freezer 230 may be communicatively coupled with the controller of the greenhouse skeleton system. Further, when the freezing column of semiconductor refrigeration is used, each or several semiconductor chilling plates in the freezing column may be controlled or driven by an independent sub-controller, so the freezing may be achieved in different regions or a freezing intensity may be adjusted. In particular, the controller may change an output power of the semiconductor chilling plate by adjusting a duty ratio of an output signal, so as to adjust the refrigeration intensity. In addition, the freezing column may realize a conversion between a heat-absorbing end and a heat-releasing end of the semiconductor chilling plate by connecting the current in reverse, so as to thaw a frozen sand layer.

According to an optional embodiment, the desert greenhouse skeleton system provided by the disclosure further includes a temperature acquisition unit, the temperature acquisition unit may include a lot of temperature sensors. Specifically, the temperature acquisition unit may include multiple first temperature sensors connected to each of the freezers 230 in a manner corresponding to at least one of the freezers 230, and the first temperature sensors may be respectively used for acquiring the temperature of the sand layer corresponding to each of the freezers 230. Further, the temperature acquisition unit may also include one or more second temperature sensors arranged on a periphery of the greenhouse, and the second temperature sensors are used for acquiring an external environmental temperature of the greenhouse. In addition, each temperature sensor is communicatively coupled to the system controller to allow the controller to determine an indoor and outdoor temperature difference based on the temperature data obtained by an internal temperature sensor and an external temperature sensor of the greenhouse, so as to start the freezer 230 and control the freezing parameters of the freezer 230, such as freezing mode, corresponding cooling power, cooling cycle, etc.

According to an optional embodiment, referring to FIG. 3, the skeleton outer base 210 and the skeleton inner bases 220 are further connected with first connecting rods 250 arranged along a length direction thereof and second connecting rods 260 arranged along a width direction thereof. For example, when viewed from the top view as shown in FIG. 3, a number of first connecting rods 250 and second connecting rods 260 are arranged on the outer skeleton base 210 and the inner skeleton base 220 in a staggered manner.

According to an optional embodiment, as shown in FIG. 3, the first connecting rod 250 and the second connecting rod 260 may be provided with a humidifying pipeline 240. The humidifying pipeline 240 has holes allowing liquid to flow out to penetrate into the sand layer. Specifically, several humidifying pipelines 240 are attached to the corresponding first connecting rods 250 and second connecting rods 260 along the length direction and the width direction, respectively. Alternatively, the first connecting rod 250 and the second connecting rod 260 may have grooves (not shown in the figure) for accommodating the humidifying pipeline 240 for fixing the humidifying pipeline 240. In particular, the environment temperature of the crops planted on the surface of the sand layer may be adjusted by passing water through the humidification pipeline 240 to provide a suitable growth environment for the crops, and the moisture provided by the humidification pipeline 240 may enter the sand layer, thus allowing the freezer 230 to coagulate the sand layer with the moisture.

Alternatively, the humidifying pipeline 240 may include a soaking pipe, the soaking pipe is basically vertically placed in the sand layer, and the humidifying pipeline 240 is allowed to inject water into the sand layer through the soaking pipe, so the sand layer and the water immersed in the sand layer (including self-contained water and added water of sand layer) may be condensed by the freezer 230, so as to condense the sand layer as a foundation part into a solid structure and prevent the greenhouse skeleton structure from settling, collapsing or tilting.

According to an optional embodiment, in the present disclosure, the freezing parameters of the freezer 230 are adjusted in association with the sand layer temperature and/or the distribution positions of the freezers 230. Especially, with duration of daytime sunshine, the temperature difference between the inside and outside of the greenhouse intensifies, where the overall temperature change or the temperature difference between the inside and outside of the greenhouse is related to the sunlight trajectory in time.

According to an optional embodiment, with the change of the sun's moving track, at the same time/period, the sunny side of the greenhouse is directly exposed to the sun, and the temperature rises rapidly, having greater temperature fluctuation than the shady side of the greenhouse, so the sand layer on the sunny side of the greenhouse loses water faster and is easy to form a larger temperature difference between inside and outside. Especially, in order to maintain the structure stability of the greenhouse, on the one hand, it is necessary to keep the temperature of the sand layer within a proper range in addition to adopting a reinforcement structure with qualified strength (e.g., pile-type base column 211), so as to avoid the high temperature environment accelerating the water loss of the sand layer and forcing the sand layer soil to be further soft and easy to collapse. In view of this, the controller may adjust the freezing parameters of the freezer 230, such as the cooling power and/or the freezing time, according to temperature information related to the greenhouse when the temperature sensor collects the temperature field information around and inside the greenhouse. Alternatively, the controller may dynamically adjust the freezing parameters of the freezer 230, such as cooling power and/or freezing time, based on the temperature change of the sand layer caused by the change of the sunlight trajectory.

Specifically, the sunlight trajectory changes with the movement of the sun during sunshine, and in response to the sand temperature information or atmospheric temperature information collected by the temperature sensor, when the temperature of the sand layer outside the greenhouse exceeds an appropriate temperature threshold range, the controller may at least start one or more freezers 230 in the outer annular array of the greenhouse, and keep the output of the partial freezers 230 for a predetermined period of time, so as to coagulate and maintain part of the sand layer outside the greenhouse, thereby at least strengthening the sand layer outside the greenhouse. Alternatively, when the temperature of the sand layer inside the greenhouse exceeds the appropriate temperature threshold range, the controller may at least start the freezers 230 in one or more inner annular arrays the greenhouse, and keep the output of the partial freezers 230 for a predetermined period of time, so as to coagulate part of the sand layer inside the greenhouse through the internal freezers 230, thereby at least strengthening the sand layer inside the greenhouse. Further, during a startup of the freezer 230, the cooling power of the freezer 230 is dynamically adjusted by the controller based on sand layer temperature information or atmospheric temperature information, such as increasing the cooling power of the freezer 230 based on the increase of ambient temperature or indoor and outdoor temperature difference.

Especially, the temperature fluctuation of the underground sand layer usually inside the greenhouse is relatively small due to the light shielding of the greenhouse. However, in extremely hot weather, the high heat of the surrounding sand layer and the high temperature inside the greenhouse will still increase the temperature of the internal sand layer, especially the sand with small specific heat capacity will obviously increase the temperature only by absorbing a small amount of heat, so it is still necessary to keep the temperature of the internal sand layer stable. Therefore, when at least multiple freezers 230 near the periphery are started based on the external sand layer temperature, multiple freezers 230 in at least one inner annular array may be started based on the internal sand layer temperature.

In addition, because the desert greenhouse is located near the water-containing area, when the freezer 230 is used to cool and solidify the sand layer, the freezer 230 may use part of the groundwater owned by the sand layer. However, due to a limited content, a coagulation strength of the sand layer is limited, so supplementary water may be provided to the underground sand layer through the humidifying pipelines 240 arranged on the underground skeleton 200 at the same time to increase the water content of the sand layer and promote the improvement of the coagulation strength of the sand layer. In particular, the controller may change the output power of the semiconductor chilling plate by adjusting the current (or duty cycle of PWM signal) output to the freezer 230. Specifically, the cooling power of the freezer 230 may be changed accordingly based on at least the external sand layer temperature. More specifically, the cooling power of the freezer 230 may be correspondingly increased with the increase of the external sand layer temperature. For example, the cooling power of the freezer 230 is b kw at 50° C. and a kw at 70° C., where a>b.

According to an optional embodiment, in view of the change of the sun's moving track, the sunny side and the shady side of the greenhouse usually have different temperature performances, especially the sunny side of the greenhouse has more obvious temperature fluctuation due to the direct sunlight. Therefore, in the present disclosure, the cooling power of the freezer 230 is set in association with the sunlight trajectory. Specifically, based on the temperature difference between the sunny side and the shady side of the greenhouse, at least part of the freezer 230 on the sunny side and at least part of the freezer 230 on the shady side of the greenhouse may have different cooling power from each other.

According to an optional embodiment, the cooling power of at least part of the freezer 230 on the sunny side of the greenhouse may be greater than the cooling power of at least part of the freezer 230 on the shady side. Therefore, the cooling power is increased on the side with obvious temperature fluctuation, especially the more severe water loss, so the sand layer on the corresponding side is condensed, thereby strengthening the sand layer foundation. Correspondingly, the output of the freezer 230 on the shady side is reduced. Therefore, while ensuring an overall stability of a sand foundation based on the temperature change of the sand layer, unnecessary energy consumption may be saved in the desert where hydropower resources are extremely precious, so as to improve a sustainability of the desert greenhouse and make more use of energy to the crop growth process rather than the sand layer reinforcement of the foundation.

In addition, the cooling power of the partial freezers 230 corresponding to the sunny side and the shady side of the greenhouse changes with the change of the sunlight trajectory, that is, the sunny side and the shady side of the greenhouse change with the sunlight trajectory in time. Therefore, the partial freezers 230 corresponding to the sunny side and the shady side of the greenhouse are also relatively changed, so the cooling power corresponding to the freezers 230 in different areas should be adjusted according to the temperature change caused by the change of sunbeam. In particular, a specific number of freezers 230 corresponding to the sunny side and the shady side of the greenhouse may be edited/set by managers themselves. Or the specific number of freezers 230 corresponding to the sunny side and the shady side of the greenhouse may come from machine learning, preset threshold programming, etc., among them, machine learning may, for example, determine the number of freezers 230 corresponding to the sunny side and the shady side of the greenhouse respectively by determining the sunlight irradiation direction relative to the irradiation surface of the greenhouse.

According to an optional embodiment, in the present disclosure, the cooling power of one or more freezers 230 in each group of annular arrays varies along the arrangement direction of the annular arrays as shown in FIG. 4. In other words, the freezers 230 in the same annular array may have different cooling powers from those of the freezers 230 in the adjacent annular array.

According to an optional embodiment, in the present disclosure, the multiple freezers 230 are divided into several groups in an annular array, which means that freezers 230 of each group are connected to the corresponding skeleton inner base 220, so as to form a rectangular-ambulatory-plane (i.e., rectangular annular) structure in the plane as shown in FIG. 4, and further make the groups of freezers 230 present a layer-by-layer surrounding arrangement in the plane as shown in FIG. 4. Namely, many groups of freezers 230 are arranged in each inner skeleton base 220 inside the outer skeleton base 210 in a concentric circle manner.

Specifically, compared with the sand layer outside the desert greenhouse, the sand layer has obvious temperature change due to the influence of sunlight, which is easy to produce a larger temperature difference between day and night. However, the inner sand layer has less temperature fluctuation because of an obstruction of sunlight by the facade of the greenhouse. Therefore, as far as the stability of sand foundation is concerned, the cooling power of the freezer 230 near the periphery may be improved, thus maintaining the stability of a peripheral skeleton structure in a targeted manner. Therefore, in the present disclosure, the cooling powers of the multiple freezers 230 may be reduced from the outside to the inside along the arrangement direction of the annular array. In other words, for example, as shown in FIG. 4, the freezers 230 distributed near the skeleton outer base 210 may have greater cooling power than those distributed away from the skeleton outer base 210. A peripheral annular array in the present disclosure refers to the freezers 230 which are relatively close to the skeleton outer base 210 and distributed to the corresponding skeleton inner base 220. The inner annular array refers to multiple freezers 230 which are relatively away from the skeleton outer base 210 and distributed to the corresponding skeleton inner base 220.

However, the improvement of the overall structure stability and energy consumption reduction brought by the above-mentioned configuration method for the cooling power of the freezer 230 may not be as expected, which ignores that the greenhouse skeleton has obvious temperature fluctuation compared with the peripheral side, especially the sunny side, due to the influence of sunlight, so the closer the sand layer is to the sunny side or the outside of the greenhouse, the more serious the water evaporation in the sand layer is. Therefore, when using the freezer 230 to coagulate the sand soil on the sunny side, it is necessary to obviously increase the water and electricity consumption to make up for the loose sand structure caused by the large temperature rise and water loss. However, even if a condensation strength is improved by increasing the output of the freezer 230, it is difficult for the condensed sand layer to maintain a stable high-strength shape due to a continuous fluctuation of moisture and temperature, so the improvement of the overall structure of the greenhouse skeleton is not as expected, and with the continuous change of the external atmospheric temperature, the water and electricity consumption is also constantly fluctuating and may not be accurately estimated. Therefore, frequently increasing or decreasing the cooling power of the peripheral freezer 230 may be involved, this situation will easily affect the service life of the freezer 230. Once the freezer 230 is damaged and replaced, a huge workload will be undoubtedly increased, this situation is the last thing managers want to see in places with many conditions, such as desert. On the contrary, the temperature difference between day and night of the sand layer inside the greenhouse is not as severe as the temperature difference between day and night of the peripheral sand layer, and the planting soil laid inside the greenhouse itself provides part of the water source, making the corresponding underground sand layer may easily maintain a relatively high humidity, and the humidity environment is not easy to fluctuate obviously with the continuous change of the external environment, so the freezing and reinforcement of the sand layer inside the greenhouse by the freezer 230 is easier to maintain.

As a more optional embodiment, in the present disclosure, the cooling powers of the freezers 230 in the outer annular array may be less than the cooling powers of the freezers 230 in the inner annular arrays. In other words, in order to maintain the overall structure stability and reduce an excessive consumption of limited hydropower energy in desert areas, the freezer 230 kept in the underground sand layer inside the greenhouse may provide more powerful refrigeration and condensation effect. Specifically, compared with increasing the cooling power of the peripheral freezer 230, because the inner sand layer has a relatively stable humidity environment and the temperature difference is not as drastic as the temperature difference of the outside, a condensation structure of the inner sand layer is easier to maintain when increasing the cooling powers of the inner freezers 230. Further, while improving the condensation strength of the inner sand layer, the condensation structure of the inner sand layer will conduct the high humidity (or low/negative temperature) state of the inner sand layer to the outer sand region through the sand layer, thus promoting the condensation of the outer sand layer. Because the sand layer is a continuous structure, the inner sand layer in the condensed state may rely on the relatively stable high strength of the inner sand layer to maintain the condensed state of the outer sand layer through the assistance of adjacent sand layers. More importantly, for desert environment, it is extremely important to rationally plan energy allocation to reduce losses. Compared with the cooling power of the freezer 230 in the outer annular array, the cooling powers of the inner annular freezers 230 are improved, so as to promote the reinforcement, formation and maintenance of the peripheral sand layer through the stable high strength and relative high humidity of the inner condensed sand layer, and the overall consumption of hydropower energy may be reduced. In addition, upgrading or maintaining the structure stability of the internal underground sand layer may maintain the stability of the whole greenhouse skeleton structure. The stability of the regional structure contributes to the stability of the soil planting surface. Compared with the stability of the peripheral structure, the structure stability of the sand layer loaded with crops is more important, because the structure stability directly affects the growth process of crops.

According to an optional embodiment, the above-ground skeleton 100 mainly includes a pipe rack structure, and the pipe rack uses pipes as raw materials. In particular, demoulding rods and square pipes may be used for pipes, so the film pressing rope may be greatly saved. Specifically, referring to FIG. 1, the above-ground skeleton 100 may include several vertical skeletons 110 and arched skeletons 120. Further, as shown in FIG. 2, the vertical skeletons 110 are connected to the top surface of the skeleton outer sheet 210 in a substantially vertical manner along the gap of the rectangular-ambulatory-plane structure of the skeleton outer sheet 210. In particular, a greenhouse facade structure as shown in FIG. 1 may be constructed by several vertical skeletons 110.

According to an optional embodiment, multiple arched skeletons 120 are arranged above the underground skeleton 200 by connecting one or more vertical skeletons 110, so a roof covering structure of the greenhouse is constructed by the arched skeletons 120. Specifically, the arched skeleton 120 is optional configured to have a multi-arch long-span structure, namely the distance between two arch columns forming a single arch is large, so as to allow large machinery (e.g. seeder, harvester) to pass the space of the single arch.

Alternatively, for a long-span arch skeleton structure, the distance between two arch columns of a single arch is not less than, for example 8.5 meters. Further, there is no aisle in the middle of the multi-arch structure. In other words, there is no space between two adjacent arched skeletons 120. In this case, the same arch column may be used for the connecting parts of two adjacent arch skeletons 120. In particular, the arch column may adopt a square tube. It should be understood that the above dimensions are only illustrative as non-limiting examples and should not be regarded as specific limitations of the present disclosure.

According to an optional embodiment, in the present disclosure, the covering structure built on the arched skeleton 120 may include at least two layers, namely, an outer covering layer and an inner covering layer. Specifically, the outer covering layer is used to weaken a light intensity or isolate some sunlight, and prevent impurities such as dust, sand dust and rain from entering the greenhouse. The inner covering layer may be used as insulation layer and may be used to maintain a suitable and stable temperature environment inside the greenhouse. In particular, the inner covering layer may be constructed as a double-layer thermal insulation quilt structure.

According to an optional embodiment, since pollutants such as sand dust often accumulate on the outer covering layer, especially in desert areas, the outer covering layer may be constructed with an inclined surface structure with at least partially inclined to the ground. The inclined plane structure may be realized by using the curvature of the multi-arch structure itself, and the outer covering layer is made of low-adhesion cloth or plastic, so sand dust particles may slide down the inclined plane of the outer covering layer to avoid accumulation.

Optionally, a middle connecting part of the multi-arch, that is, the multi-arch column between adjacent arched skeletons 120, may be constructed as a hollow structure, so the outer covering layer may be connected with the multi-arch column in a way of guiding sand dust into the hollow multi-arch column. Specifically, the outer covering layer is joined to a top outer edge of the multi-arch column, while a hollow opening at the top is exposed to the outside. With the above structure, the sand dust sprinkled on the surface of the outer covering layer may slide down along the inclined surface of the outer covering layer, and just slide down along the multi-arch structure to the middle multi-arch column, so as to be guided to the ground or underground by the hollow multi-arch column. The advantages of this scheme are that the scheme may realize a self-cleaning of the facade of the greenhouse, prevent a large amount of sand dust from gathering on the top of the greenhouse to damage the structure, and reduce the obstruction to light. In addition, the hollow multi-arch column may store a large amount of air, and because of the poor thermal conductivity of air, thus achieving a better thermal insulation effect, that is, the air accumulates heat during the day and releases heat at night, consequently helping plants to maintain a suitable temperature at night, which is extremely important for desert areas with huge temperature difference between day and night.

Further, a grounding end of the multi-arch column is inserted under the sand layer and connected with the corresponding heat preservation pool under the ground. The heat preservation pool is used to store heat storage substances, these heat storage substances may store heat during the day and release heat at night to supplement the indoor temperature. The most economical and environmentally friendly heat storage substance in desert area is sand, so the sand dust flowing from the top of the greenhouse may be discharged into the underground heat storage pool as a supplementary source of heat storage substance, thus reducing the maintenance cost for the contents of the heat storage pool and improving a self-sustainability of the system in extreme environment.

According to an optional embodiment, the outer covering layer may be made of a film material such as a plastic film. The inner covering layer may be made of materials commonly used in building insulation and greenhouse insulation, and fire-resistant and fireproof materials are preferred.

According to an optional embodiment, corresponding to the above-mentioned at least two-layer covering structure, in the present disclosure, the arched skeleton 120 may also be configured as a double-layer structure, and correspondingly called an inner vault and an outer vault. Specifically, each layer of the arched skeleton 120 may be used to install at least one covering layer.

According to an optional embodiment, when the double-layer quilt structure is not used, for example, a rolling blinds machine may be wound up. In particular, a rolling blinds machine may perform automatic rolling in an electric manner. A special case of the rolling blinds machine is a low-gravity rolling blinds machine, containing a shaft connected to the double-layer insulation quilt and several moving components, the moving components may move on the inner vault pipe support structure. The moving component may be driven by driving equipment (e.g. motor) to move along the pipe rack of the inner vault, so as to drive the shaft of the double-layer insulation quilt to roll the double-layer quilt structure up.

According to an optional embodiment, specifically, a desert greenhouse skeleton as shown in FIG. 1, FIG. 2, FIG. 3, and FIG. 4 may be built according to the following steps.

The skeleton outer base 210 of the underground skeleton 200 is placed in the sand layer surface or the sand layer, and multiple base columns 211 connected with the underground skeleton 200 are at least partially inserted into the sand layer to stabilize the outer base 210.

Multiple freezers 230 are attached to each skeleton inner base 220 of the underground skeleton 200 in a preset annular array arrangement rule, and are at least partially inserted into the sand layer.

Multiple humidifying pipelines 240 are arranged inside the skeleton outer base 210 of the underground skeleton 200.

Each freezer 230 is selectively controlled to perform freezing treatment on the humidified sand layer.

Multiple vertical skeletons 110 of the above-ground skeleton 100 are basically vertically connected to the skeleton outer base 210 of the underground skeleton 200, and multiple arch skeletons 120 are built among the vertical skeletons 110.

The facade and top surface of the desert greenhouse are built by the vertical skeletons 110 and the arched skeletons 120.

Alternatively, the sand layer may be compacted and leveled to some extent after being humidified by the humidifying pipelines 240.

Especially, when the greenhouse framework is built, chemicals capable of curing sand may be added to an excavated bunker foundation in advance, so the corresponding part of sand may be solidified to form a more solid sand wall, thus facilitating a subsequent construction.

According to an optional embodiment, the desert greenhouse skeleton system provided by the disclosure further includes a ventilation unit, and the ventilation unit adopts a rolled film ventilation component. In particular, the rolled film ventilation components may be arranged at the east and west sides of the greenhouse, and controlled by the electric film rolling mechanism, so as to realize the opening and closing of the vents at the east and west sides and the top of the greenhouse. Further, an axial fan may be installed on the south side of the greenhouse, and a wet curtain may be installed on the north side of the greenhouse. The wet curtain has a water outlet and a water inlet. The water outlet is located at a high level of gravity potential energy, and the water inlet is located at a low level of gravity potential energy. Water passes through the wet curtain surface, enters through the water inlet and is discharged through the water outlet, and forms a circulation with the pump, thus forming a water curtain on the surface of the wet curtain. The fan is arranged on the back of the wet curtain to blow air from the water curtain of the wet curtain. Specifically, during the high temperature period, the axial fan drives the outdoor air to enter the greenhouse through the wet curtain, and the sensible heat of the air is converted into latent heat at the wet curtain, thus achieving a purpose of conveying cold air for the greenhouse to cool down. Optionally, the steam released to the environment by plant transpiration may be condensed and recovered, and the recovered liquid may be transported to the wet curtain as raw material, thus realizing the recycling of resources in the field.

According to an optional embodiment, the desert greenhouse skeleton system provided by the disclosure further includes a heating unit, the heating unit may include an active heat storage and release module, a solar heat collection module and an electromagnetic heating module. Specifically, the active heat storage module includes a crop root heating pipeline and an air heating pipeline. The crop root heating pipeline may be a hot pipe, arranging at a root of the plant for providing heat to the root of the plant. The air heating pipeline may be an air heating sheet, the air heating pipeline may be arranged on a circumferential side surface and the top surface of the greenhouse, and is optionally arranged near the plant canopy, so as to simultaneously heat the plant canopy, make the temperature of the plant root and the canopy suitable, and thus promoting the growth of crops. The electromagnetic heating module may be arranged in the heat storage pool, and when the supply temperature of the heat storage pool is insufficient, the electromagnetic heating module is started to heat the thermal insulation material to make the thermal insulation material rise to the required temperature.

Embodiment 2

This embodiment is a further improvement of the content of Embodiment 1, and the repeated content will not be repeated here.

Figure 6:
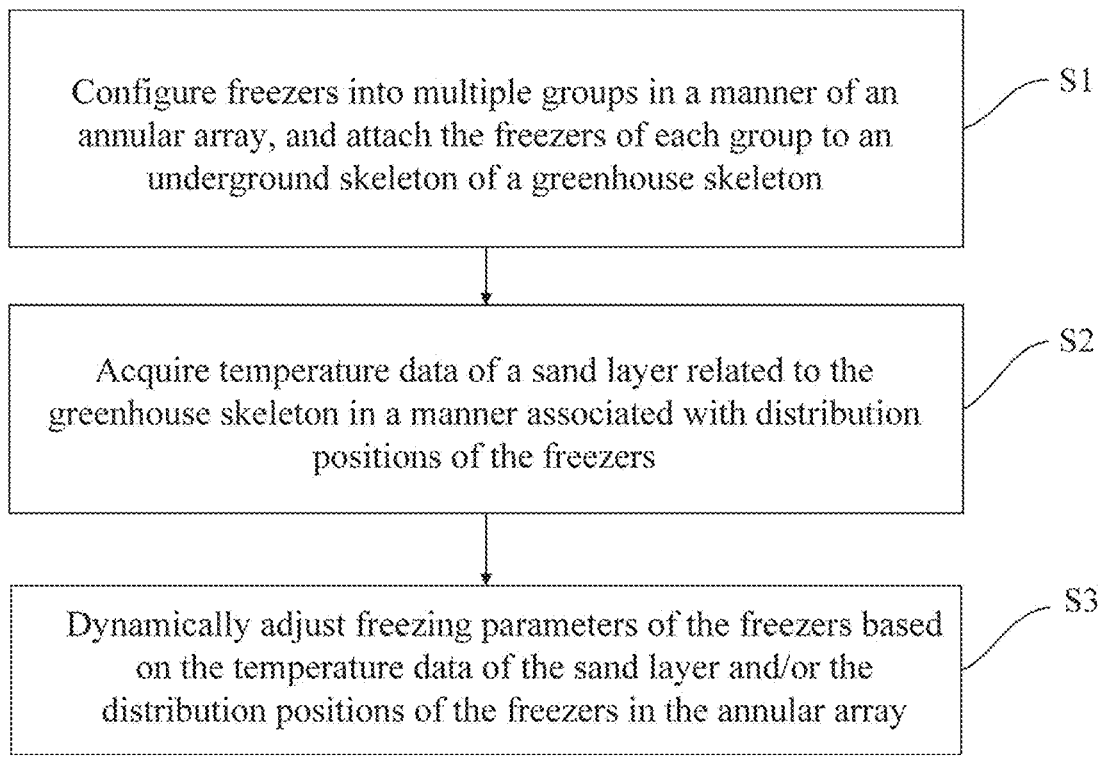
FIG. 6 is a flowchart of a method for controlling the desert greenhouse skeleton according to the embodiment provided by the present disclosure.

The disclosure provides a method for controlling the desert greenhouse skeleton based on the desert greenhouse skeleton system described in Embodiment 1, the control method may include the following steps, as shown in FIG. 6.

S1: multiple freezers 230 are configured into multiple groups in an annular array manner, and the freezers 230 of each group are attached to the underground skeleton 200 of the greenhouse skeleton.

S2: temperature data of the sand layer related to the greenhouse skeleton is acquired in a manner associated with the distribution positions of the freezer 230.

S3: the freezing parameters of the freezer 230 are dynamically adjusted based on the temperature data of the sand layer and/or the distribution positions of the freezers 230 in the annular array.

According to an optional embodiment, the steps of dynamically adjusting the freezing parameters of the freezers 230 based on the temperature data of the sand layer and/or the distribution positions of the freezers 230 in the annular array may include:

the freezing parameters of one or more freezers 230 in each group of the annular array are dynamically adjusted over time based on the temperature change of the sand layer caused by the change of the sunlight trajectory.

According to an optional embodiment, the steps of dynamically adjusting the freezing parameters of the freezers 230 based on the temperature data of the sand layer and/or the distribution positions of the freezers 230 in the annular array further include:

one or more freezers 230 are controlled to exhibit varying cooling powers in the arrangement direction of the annular array.

It should be understood by those skilled in the art that other steps or operations may be included before and after the above steps, or between steps, as long as the purpose of the present disclosure may be achieved, such as further optimizing and/or improving the method described in the present disclosure. Furthermore, although the method described in the present disclosure is shown and described as a series of actions executed in sequence, it should be understood that the method is not limited by the sequence. For example, some acts may occur in a different order than that described herein. Alternatively, one action may occur at the same time as another.

It should be noted that the above specific embodiments are exemplary, and those skilled in the art may come up with various solutions inspired by the disclosure, and these schemes also fall within the scope of the disclosure and protection of the present disclosure. It should be understood by those skilled in the art that the description of the disclosure and attached drawings are illustrative and do not constitute a limitation on the claim. The scope of protection of the present disclosure is defined by the claims and their equivalents. The description of the disclosure contains many inventive concepts, such as "optionally", or "according to a preferred embodiment", which all indicate that the corresponding paragraph discloses an independent concept, and the applicant reserves the right to file a divisional application according to each inventive concept.

What is claimed is:

1. A desert greenhouse skeleton system, comprising:
   a greenhouse skeleton, comprising an above-ground skeleton and an underground skeleton detachably combined;
   a plurality of freezers operatively attached to the underground skeleton, wherein the freezers are configured into a plurality of groups in a manner of an annular array, distribution positions of the freezers in the annular array comprise an outer annular array and an inner annular array, and the freezers are at least partially placed in a sand layer; and
   a controller communicatively coupled to the freezers and configured to dynamically adjust freezing parameters of the freezers based on a temperature of the sand layer and/or the distribution positions of the freezers in the annular array,
   wherein a cooling power of one or more freezers in the outer annular array is less than a cooling power of one or more freezers in the inner annular array.

2. The desert greenhouse skeleton system according to claim 1, wherein the controller is configured to dynamically adjust the freezing parameters of one or more freezers in each group of the annular array over time based on a temperature change of the sand layer caused by a change of a sunlight trajectory.

3. The desert greenhouse skeleton system according to claim 1, wherein a cooling power of a portion of the freezers corresponding to a sunny side of the greenhouse skeleton related to a sunlight trajectory over time is greater than a cooling power of a portion of the freezers corresponding to a shady side of the greenhouse skeleton.

4. The desert greenhouse skeleton system according to claim 1, wherein the freezing parameters of the freezers dynamically adjusted by the controller based on the distribution positions of the freezers in the annular array comprise cooling powers of the freezers controlled to vary along an arrangement direction of the annular array.

5. The desert greenhouse skeleton system according to claim 1, further comprising a plurality of operable humidifying pipelines, and wherein the humidifying pipelines are mutually staggered and connected to the underground skeleton.

6. The desert greenhouse skeleton system according to claim 1, wherein each of the freezers comprises:
   a hot end protective sleeve;

a cold end protective sleeve arranged radially outside the hot end protective sleeve; and a plurality of semiconductor chilling plates axially and circumferentially arranged between the hot end protective sleeve and the cold end protective sleeve.

7. The desert greenhouse skeleton system according to claim 6, wherein the semiconductor chilling plates are connected to each other through a flexible circuit to form a plurality of annular arrays along an axial direction of the hot end protective sleeve and/or the cold end protective sleeve.

8. A method for controlling a desert greenhouse skeleton, comprising:

configuring a plurality of freezers into a plurality of groups in a manner of an annular array, distribution positions of the freezers in the annular array comprising an outer annular array and an inner annular array; and attaching the freezers of each group to an underground skeleton of a greenhouse skeleton;

acquiring temperature data of a sand layer related to the greenhouse skeleton in a manner associated with the distribution positions of the freezers; and dynamically adjusting freezing parameters of the freezers based on the temperature data of the sand layer and/or the distribution positions of the freezers in the annular array, wherein a cooling power of one or more freezers in the outer annular array is less than a cooling power of one or more freezers in the inner annular array.

9. The method for controlling the desert greenhouse skeleton according to claim 8, wherein the dynamically adjusting the freezing parameters of the freezers based on the temperature data of the sand layer and/or the distribution positions of the freezers comprises:

dynamically adjusting the freezing parameters of one or more freezers in each group of the annular array over time based on a temperature change of the sand layer caused by a change of a sunlight trajectory; and/or enabling the freezers to have varying cooling powers along an arrangement direction of the annular array.

* * * * *